(12) United States Patent
Montgomery et al.

(10) Patent No.: US 8,708,046 B2
(45) Date of Patent: Apr. 29, 2014

(54) CLOSED LOOP ENERGY PRODUCTION FROM GEOTHERMAL RESERVOIRS

(75) Inventors: Carl T. Montgomery, Grove, OK (US); Daniel R. Maloney, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 453 days.

(21) Appl. No.: 11/941,598

(22) Filed: Nov. 16, 2007

(65) Prior Publication Data

US 2009/0126923 A1 May 21, 2009

(51) Int. Cl.
*E21B 36/00* (2006.01)
*F03G 4/00* (2006.01)

(52) U.S. Cl.
USPC ............ 166/302; 166/57; 60/641.2; 60/641.3

(58) Field of Classification Search
USPC .............................. 166/303, 302, 57; 165/45; 60/641.2–641.4
See application file for complete search history.

(56) References Cited

U.S. PATENT DOCUMENTS

| | | | |
|---|---|---|---|
| 3,040,528 A | | 6/1962 | Tabor et al. |
| 3,875,749 A * | | 4/1975 | Baciu ........................... 60/641.2 |
| 4,201,060 A | | 5/1980 | Outmans |
| 4,297,847 A | | 11/1981 | Clayton |
| 4,357,802 A * | | 11/1982 | Wahl et al. ................... 60/641.5 |
| 4,358,930 A | | 11/1982 | Pope et al. |
| 4,426,849 A | | 1/1984 | Matthews |
| 4,512,156 A | | 4/1985 | Nagase |
| 4,760,705 A | | 8/1988 | Yogev et al. |
| 4,912,941 A * | | 4/1990 | Buchi ............................. 62/260 |
| 5,311,741 A * | | 5/1994 | Blaize ............................ 60/676 |
| 5,400,598 A | | 3/1995 | Moritz et al. |
| 5,862,866 A * | | 1/1999 | Springer ...................... 166/380 |
| 5,911,684 A | | 6/1999 | Schnell |
| 6,668,554 B1 * | | 12/2003 | Brown ........................ 60/641.2 |
| 7,096,665 B2 | | 8/2006 | Stinger et al. |
| 7,118,606 B2 | | 10/2006 | Labinov et al. |
| 2003/0010652 A1 * | | 1/2003 | Hunt ............................ 205/742 |
| 2006/0048770 A1 * | | 3/2006 | Meksvanh et al. ............ 126/620 |

FOREIGN PATENT DOCUMENTS

WO   WO 2006002325   1/2006

OTHER PUBLICATIONS

Jason McKenna, David Blackwell, Christopher Mayes, and P. Dee Patterson; Geothermal Electric Power Supply Possible from Gulf Coast, Midcontinent Oil Field Waters; Oil & Gas Journal; Sep. 5, 2005; pp. 34-40; PennWell, Dallas, Texas.
V. Ryan; Binary Cycle Power Plant; http///www.technologystudent.com/energy1/geo3.htm; 2005.

* cited by examiner

*Primary Examiner* — Jennifer H Gay
*Assistant Examiner* — Elizabeth Gitlin
(74) *Attorney, Agent, or Firm* — ConocoPhillips Company

(57) ABSTRACT

Apparatus and methods for recovering and using geothermal energy. Such methods include at least partially vaporizing a working fluid by passing it through a flow loop that at least partially extends into a heated subterranean zone and employing the vaporized working fluid to power a turbine. At least a portion of the flow loop can comprise a depleted or partially depleted hydrocarbon well.

1 Claim, 1 Drawing Sheet

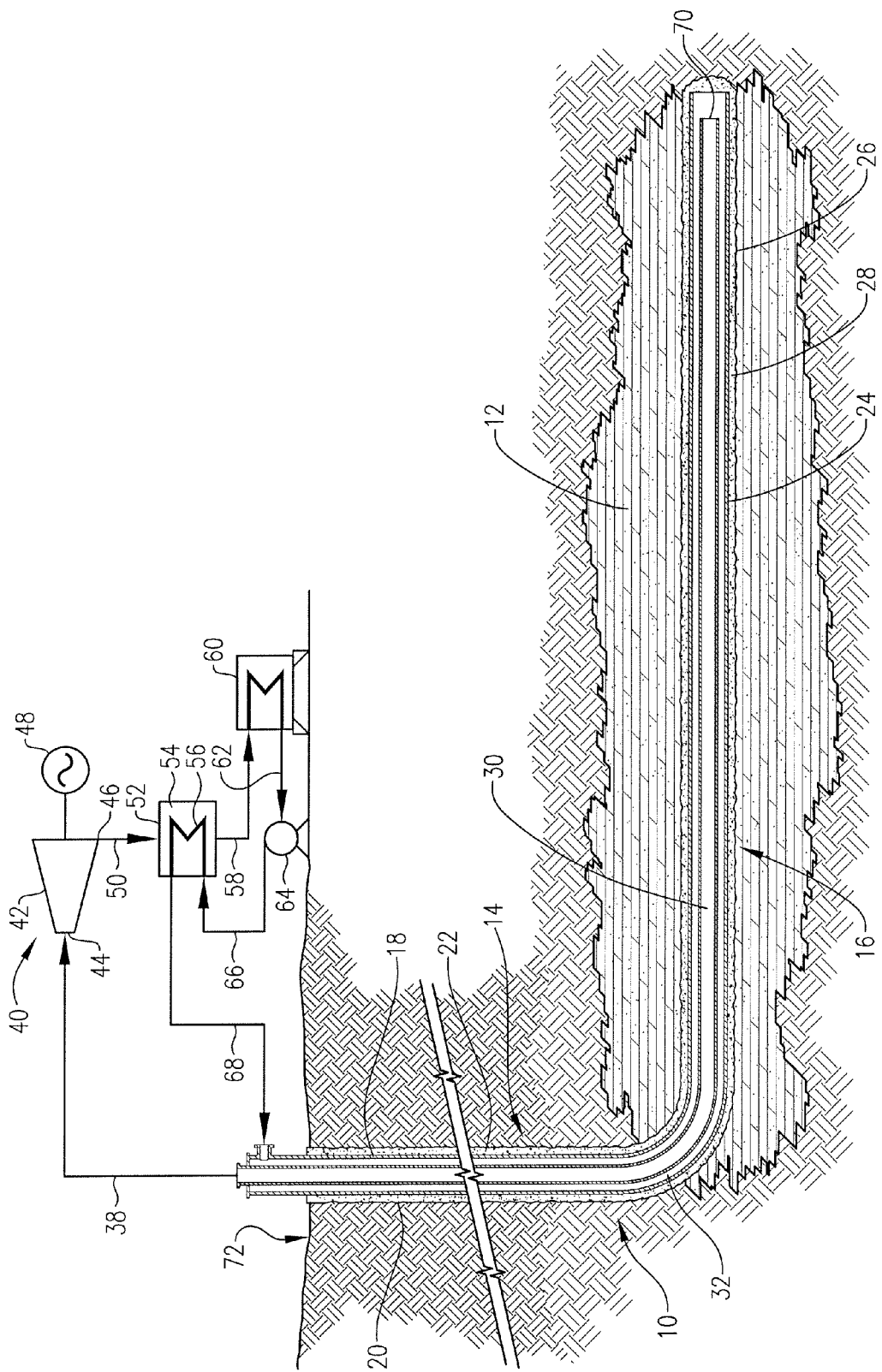

CLOSED LOOP ENERGY PRODUCTION FROM GEOTHERMAL RESERVOIRS

BACKGROUND OF THE INVENTION

1. Field of the Invention

The present invention relates generally to apparatus and methods for recovering energy from geothermal reservoirs. More specifically, the present invention relates to apparatus and methods for retrieving and converting geothermal energy employing at least partially depleted hydrocarbon wells.

2. Description of the Prior Art

As the world continues to focus more and more attention on the effects of greenhouse gas emissions on global warming, greater efforts are being spent searching for cleaner and renewable energy sources. One such source comes in the form of geothermal energy. Often, geothermal energy is obtained by exploitation of geothermal water reservoirs.

One method of obtaining and converting geothermal energy comes from the use of a dry steam power plant. Dry steam power plants use dry steam from geothermal reservoirs produced at the surface to drive a turbine coupled to a generator, thereby generating electricity. Another method involves the use of a flash steam power plant, which uses produced geothermal water under high pressure to generate steam via a flash tank. The steam, in turn, can be used to drive a turbine coupled to a generator to create electricity. A third method involves a binary cycle power plant. In a binary cycle power plant, geothermal water is pumped to the surface and passed through a surface-level heat exchanger, which transfers heat to a working fluid. At least a portion of the working fluid is typically converted to a vapor phase in the heat exchanger and can then be used to power a turbine.

In each of the above processes, a geothermal water reservoir must be found in a subterranean formation that is sufficiently porous and permeable so as to facilitate pumping the geothermal water to surface level for use. Such restrictions severely limit the number of reservoirs that may be used to produce geothermal energy. Techniques do exist to enhance porosity and permeability, but such operations are costly and time consuming. Accordingly, there is a need for geothermal energy production processes that do not require the subterranean formations containing geothermal water reservoirs to be highly permeable and porous.

After a hydrocarbon well has exceeded its economic usefulness, the depleted well is typically filled with cement and abandoned. Many of these hydrocarbon wells have high bottom-hole temperatures, sometimes in excess of 300 or 400° F. Further, many of these wells extend through or are in close proximity to geothermal water reservoirs. Accordingly, many of these abandoned wells contain or are proximate to a potential untapped energy resource. Thus, in addition to the need for improved methods and apparatus for geothermal energy extraction, there is also a need for efficient use of depleted hydrocarbon wells.

SUMMARY OF THE INVENTION

In one embodiment of the present invention, there is provided a method for recovering and using geothermal energy. The method of this embodiment comprises: (a) flowing a predominately liquid phase working fluid to a heated subterranean zone via a wellbore; (b) vaporizing at least a portion of the working fluid via indirect heat exchange with the heated subterranean zone; and (c) powering a turbine by flowing at least a portion of the vaporized working fluid through the turbine.

In another embodiment of the present invention, there is provided a method for recovering geothermal energy from a heated subterranean zone using an existing wellbore. The method of this embodiment comprises: (a) producing a hydrocarbon from a subterranean formation via an initial cased wellbore; (b) subsequent to step (a), drilling a laterally extending borehole outwardly from the initial wellbore and into the heated subterranean zone: (c) casing the laterally extending borehole to thereby form a cased lateral wellbore in fluid communication with the initial wellbore; (d) completing a retrofitted wellbore by extending a tubing string through the initial wellbore and the lateral wellbore section, wherein the retrofitted wellbore defines an annulus between the tubing and the casing of the initial and lateral wellbores; (e) forming a closed-loop fluid flow system by coupling the retrofitted wellbore in fluid flow communication with a turbine; and (f) flowing a working fluid though said closed-loop fluid flow system.

In yet another embodiment of the present invention, there is provided a system for extracting geothermal energy from a heated subterranean zone. The system of this embodiment comprises: (a) a turbine assembly defining a turbine inlet and a turbine outlet; (b) a flow loop coupled in fluid flow communication with said turbine inlet and said turbine outlet, wherein at least a portion of said flow loop extends downwardly into said heated subterranean zone; and (c) a working fluid operable to flow through said flow loop and said turbine assembly to thereby directly power said turbine assembly.

BRIEF DESCRIPTION OF THE DRAWING FIGURES

A preferred embodiment of the present invention is described in detail below with reference to the attached drawing figures, wherein:

FIG. 1 is a schematic diagram illustrating a geothermal energy extraction system according to one embodiment of the present invention, particularly illustrating a retrofitted hydrocarbon well having a power production plant in fluid communication with a well bore having a vertical and lateral portion, where the lateral portion of the wellbore extends into a heated subterranean formation.

DETAILED DESCRIPTION

FIG. 1 illustrates an embodiment of the present invention where a wellbore at least partially extending through a heated subterranean zone is coupled in fluid flow communication to a power production facility so as to form a closed-loop fluid flow system. A working fluid can circulate through the closed-loop system thereby facilitating the conversion of geothermal energy into other useful forms of energy.

In the embodiment illustrated in FIG. 1, a wellbore 10 is illustrated as extending into a heated subterranean zone 12. Any type of wellbore known in the art can be employed in the present invention. In one embodiment, at least a portion of wellbore 10 can comprise an at least partially depleted hydrocarbon well. As used herein, the term "hydrocarbon well" shall denote any well that is currently or was formerly operable to produce a hydrocarbon-containing material (e.g., crude oil and/or natural gas). As used herein, the term "partially depleted hydrocarbon well" shall denote a hydrocarbon well that has had any amount of hydrocarbon-containing material removed therefrom. As used herein, the term "depleted hydrocarbon well" shall denote a hydrocarbon well that has produced hydrocarbon-containing material in an amount of at least 50 percent of its initial estimated hydrocarbon capacity. In one embodiment, wellbore 10 can have a diameter of at least about 4 inches, in the range of from about 5 to about 12 inches, in the range of from about 6 to about 11 inches, or in the range of from 7 to 10 inches.

In one embodiment of the present invention, wellbore 10 can comprise an upright section 14. Additionally, wellbore 10 can also comprise a laterally extending section 16. Upright section 14 can be substantially vertical and can extend from the earth's surface down to at least the depth of heated subterranean zone 12. In one embodiment, upright section 14 can comprise an at least partially depleted hydrocarbon well.

At least a portion of upright section 14 can comprise casing 18 covering the earthen wellbore wall 20 of upright section 14. At least about 70 percent, at least about 85 percent, or at least 99 percent of earthen wellbore wall 20 can be covered by casing 18. Additionally, casing 18 can have a diameter of at least about 3 inches, in the range of from about 4 to about 11 inches, or in the range of from 5 to 9 inches. Casing 18 can be made from any material known in the art for casing a wellbore.

In one embodiment, casing 18 can be secured to earthen wellbore wall 20 of upright section 14 via a bonding agent 22. Any bonding agent known in the industry for securing casing to an earthen wellbore wall can be employed in the present invention. For example, bonding agent 22 can comprise cement. Cements useful as bonding agent 22 can include, but are not limited to, those containing calcium, aluminum, silicon, oxygen and/or sulfur which set and harden by reaction with water. Such cements include, but are not limited to, Portland cements, pozzolana cements, gypsum cements, aluminous cements, silica cements, alkaline cements and slag cements. Bonding agent 22 can comprise conventional particle sizes (i.e., particle sizes in the range of from about 10 microns to about 20 microns) or fine particle sizes (i.e., particle sizes in the range of from about 2 microns to about 5 microns), or mixtures thereof. The bonding agent according to the present invention may comprise Portland cements of the types defined and described in *API Specification for Materials and Testing for Well Cements*, American Petroleum Institute Specification 10, 5$^{th}$ ed., Jul. 1, 1990.

As mentioned above, wellbore 10 can comprise laterally extending section 16, which can extend from upright section 14. In one embodiment, upright section 14 can be in fluid communication with laterally extending section 16. Additionally, laterally extending section 16 can be substantially horizontal. As mentioned above, upright section 14 can comprise an at least partially depleted hydrocarbon well. In one embodiment, laterally extending section 16 can be drilled subsequent to producing hydrocarbon-containing material via upright section 14, thereby extending wellbore 10 into or further into heated subterranean zone 12. In this embodiment, a window can be cut in casing 18 to facilitate the drilling of laterally extending section 16. The window cut in casing 18 can be of any size and shape to facilitate the drilling of laterally extending section 16.

In one embodiment of the present invention, laterally extending section 16 can extend into heated subterranean zone 12 a distance of at least about 500 feet, in the range of from about 1,000 to about 10,000 feet, in the range of from about 2,000 to about 9,000 feet, or in the range of from 3,000 to 8,000 feet.

After lateral section 16 has been drilled, it can be cased. Accordingly, at least a portion of laterally extending section 16 can comprise casing 24. In one embodiment, at least about 75 percent at least about 85 percent, or at least 99 percent of the earthen wellbore wall 26 of laterally extending section 16 can comprise casing 24. Casing 24 can contain any material or materials known in the art for casing a wellbore, such as those described above with respect to casing 18. Casing 24 can be secured to earthen wellbore wall 26 via bonding agent 28. Bonding agent 28 can comprise any bonding agent known in the industry for securing casing to an earthen wellbore wall, such as those described above with reference to bonding agent 22.

In one embodiment of the present invention, a tubing string 30 can be extended through wellbore 10. Tubing string 30 can be disposed within casings 18 and 24. In one embodiment, tubing string 30 can be substantially concentric within casings 18 and 24. Tubing string 30 can extend at least about 70, at least about 80, or at least 90 percent of the length of wellbore 10. In one embodiment, tubing string 30 can have a diameter of at least about 0.5 inches, in the range of from about 1 to about 5 inches, or in the range of from 1.5 to 4 inches. Once tubing string 30 has been disposed within wellbore 10, an annular space 32 can exist between casings 18 and 24 and tubing string 30.

Tubing string 30 can be formed of any material known in the art for use in a tubing string. In one embodiment, tubing string 30 can comprise a material having low thermal conductivity, such as, for example, plastic or fiberglass. Additionally, at least a portion of tubing string 30 can be thermally insulated. In one embodiment, at least about 75 percent, at least about 85 percent, or at least 95 percent of the total length of tubing string 30 can be thermally insulated.

Any method known in the art for thermally insulating a tubing string can be employed in the present invention. In one embodiment, tubing string 30 can comprise an inner tube (not depicted) disposed within the outer tube defining an annular space therebetween. The annular space between the inner and outer tubes of tubing string 30 can be filled with one or more thermally insulating materials. The insulating material employed in tubing string 30 can be any insulating material known in the art. In an alternative embodiment, commercially available insulated tubing can be employed in tubing string 30, such as, for example, insulated tubing typically employed in steam production.

As mentioned above, wellbore 10 can extend into heated subterranean zone 12. Heated subterranean zone 12 can comprise any heated subterranean zone having an average temperature of at least about 120° C., at least about 150° C., or at least 180° C. at the location proximate to wellbore 10. The location proximate to wellbore 10 is defined as any portion of the heated subterranean zone within a five foot radius extending from earthen wellbore walls 20 and 26 along the length of wellbore 10 that extends into heated subterranean zone 12. The average temperature is determined by measuring the temperature within the five foot radius along the entire length of wellbore 10 that extends into heated subterranean zone 12 and taking an average thereof.

In one embodiment, heated subterranean zone 12 can comprise a geothermal water reservoir. As used herein, the term "geothermal water reservoir" shall denote any subterranean formation containing therein at least 10 percent by volume of water. Geothermal water reservoirs useful in the current invention can be naturally occurring, artificially created, or combinations of naturally occurring and artificially created.

As mentioned above, wellbore 10 can be coupled in fluid communication to a power production facility 40. Power production facility 40 can be any power producing facility comprising any combination of equipment capable of converting energy from a vapor phase fluid into other useful forms of energy.

In the embodiment illustrated in FIG. 1, power production facility 40 can comprise a turbine assembly 42 which can comprise a turbine inlet 44 and a turbine outlet 46. Turbine inlet 44 can be coupled in fluid flow communication with tubing string 30 via line 38. Turbine assembly 42 can comprise one or more turbines of any type known in the industry, such as, for example, steam turbines and/or expansion turbines. In one embodiment, turbine assembly 42 is a steam turbine.

Turbine assembly 42 can be operably coupled to generator 48. For example, turbine assembly 42 can be coupled to generator 48 via an output shaft (not depicted). In one embodiment, generator 48 can be configured to convert mechanical work generated by turbine assembly 42 into another form of energy. Generator 48 can be any generator known in the industry capable of converting mechanical work into another energy form. In one embodiment, generator 48 can be an electric generator. In an alternative embodiment, turbine assembly 42 and generator 48 can be substituted with a turbo alternator (not depicted).

Referring still to FIG. 1, turbine outlet 46 can be coupled in fluid flow communication to a heat exchanger 52 via line 50. In one embodiment, heat exchanger 52 can comprise a first pass 54 and a second pass 56. Turbine outlet 46 can be coupled in fluid flow communication with first pass 54 via line 50. Heat exchanger 52 can be any type of heat exchanger known in the industry where heat is indirectly transferred from one fluid to another fluid across a conductive barrier. For example, heat exchanger 52 can be a double pipe heat exchanger, a shell and tube heat exchanger (including, e.g., a u-tube or a straight tube heat exchanger), or a plate heat exchanger.

In one embodiment, first pass 54 of heat exchanger 52 can be coupled in fluid flow communication with a condenser 60 via line 58. Condenser 60 can be any type of condenser known in the art operable to at least partially condense a primarily vapor phase working fluid, as will be discussed in greater detail below. In one embodiment, condenser 60 can comprise a wet cooling tower, an air cooled condenser, or a direct water cooling system.

Condenser 60 can be coupled in fluid flow communication with a pump 64 via line 62. Pump 64 can be any type of pump known in the art operable to at least partially pressurize a working fluid, as will be discussed in greater detail below. In one embodiment, pump 64 can be coupled in fluid flow communication with second pass 56 of heat exchanger 52 via line 66. Additionally, second pass 56 can be in fluid flow communication with annular space 32, described above.

In one embodiment of the present invention, a closed-loop system can be defined as comprising wellbore 10 and turbine assembly 42. Wellbore 10 and turbine assembly 42 can be coupled in fluid flow communication to form a closed-loop fluid flow system. Turbine assembly 42 can be operated by flowing a working fluid through the closed-loop system. The closed-loop system can further comprise one or more heat exchangers, condensers, and/or pumps to facilitate circulation of the working fluid through the system. In one embodiment, the working fluid can have a flow rate through the entire loop of at least about 5 barrels per minute (bpm), at least about 7 bpm, or at least 9 bpm.

The working fluid of the present invention can be any fluid capable of being at least partially converted to a vapor phase so as to power a turbine. In one embodiment, the working fluid can be any fluid known in the art for use as the working fluid in a Rankine cycle. Additionally, the working fluid of the present invention can comprise light saturated hydrocarbons. Also, the working fluid can have a lower boiling point than the boiling point of water. Furthermore, the working fluid can comprise water in an amount of less than about 25 weight percent, less than about 20 weight percent, or less than 10 weight percent. Specific examples of fluids that can be employed as the working fluid in the present invention include, but are not limited to, methane, propane, n-butane, isobutane, n-pentane, isopentane, and/or neopentane. In one embodiment, the working fluid comprises isobutane and/or isopentane.

In one embodiment, an initial predominately liquid phase working fluid can be transported to heated subterranean zone 12 via annular space 32 of wellbore 10. As used herein, the terms "predominately," "primarily," and "majority" shall mean more than fifty percent. Once the working fluid reaches the portion of wellbore 10 that is in contact with heated subterranean zone 12, indirect heat transfer from heated subterranean zone 12 to the working fluid can occur across at least a portion of casing 18 and/or 24. In one embodiment, the indirect heat transfer from subterranean zone 12 can cause at least a portion of the predominately liquid phase working fluid to vaporize, thereby forming a predominately vapor phase working fluid. In one embodiment, at least about 50, at least about 70, or at least 90 percent of the predominately liquid phase working fluid is vaporized via the above-described indirect heat transfer.

The resulting predominately vapor phase working fluid can flow into the bottom opening 70 of tubing string 30. The predominately vapor phase working fluid in tubing string 30 can flow substantially counter current to the flow of the working fluid in annular space 32. In one embodiment, the predominately vapor phase working fluid can have a temperature immediately upon flowing into opening 70 of at least about 120° C., in the range of from about 120 to about 200° C., in the range of from about 135 to about 200° C., or in the range of from 150 to 200° C. Additionally, while the predominately vapor phase working fluid is flowing in tubing string 30, the pressure at opening 70 in tubing string 30 can be at least about 3,000 pounds per square ("psi"), in the range of from about 3,000 to about 10,000 psi, in the range of from about 4,000 to about 8,000 psi, or in the range of from 5,000 to 6,000 psi.

As the predominately vapor phase working fluid travels up tubing string 30, the temperature of the working fluid can decrease. In one embodiment, the temperature of the predominately vapor phase working fluid can decrease less than about 50° C. less than about 40° C., or less than 30° C. Additionally, the pressure in tubing string 30 can vary as the working fluid travels through it. In one embodiment, the pressure differential between opening 70 and the point where tubing string 30 intersects the plane of earthen surface 72 can be less than about 7,000 psi, less than about 4,000 psi, or less than 1,000 psi. Also, decrease in pressure and temperature can cause at least a portion of the predominately vapor phase working fluid to condense into a liquid phase. In one embodiment, less than about 20 weight percent or less than 10 weight percent of the predominately vapor phase working fluid condenses into a liquid phase while traveling through tubing string 30.

As mentioned above, turbine inlet 44 can be in fluid communication with tubing string 30 via line 38. In one embodiment, the predominately vapor phase working fluid can flow from tubing string 30 via line 38 and be introduced into turbine assembly 42 via turbine inlet 44. Immediately upon introduction into turbine inlet 44, the predominately vapor phase working fluid can have a temperature of at least about 120° C., in the range of from about 120 to about 200° C., in the range of from about 135 to about 200° C., or in the range of from 150 to 200° C. Additionally, turbine inlet 44 can have a pressure of at least about 3,000 psi, in the range of from about 3,000 to about 10,000 psi, in the range of from about 4,000 to about 8,000 psi, or in the range of from 5,000 to 6,000 psi.

Once introduced into turbine assembly 42, the predominately vapor phase working fluid can operate to rotate the one or more turbines in turbine assembly 42. In one embodiment, rotation of the one or more turbines in turbine assembly 42 can be caused, at least in part, by expansion of the predominately vapor phase working fluid. Rotation of one or more turbines in turbine assembly 42 can generate force in the form of torque on an output shaft (not depicted). Such rotation can create a force of at least about 1,000 Nm, in the range of from about 1,000 to about 10,000 Nm, in the range of from about 5,000 to about 10,000 Nm, or in the range of from 8,000 to 10,000 Nm. Furthermore, rotation of the one or more turbines in turbine assembly 42 can cause generator 48 to produce power. In one embodiment, rotation of the one or more turbines in turbine assembly 42 can cause generator 48 to produce at least about 100 kW, at least about 500 kW, or at least 1 MW.

In one embodiment, the working fluid can undergo a change in temperature while passing through turbine assembly 42. In one embodiment, the working fluid's temperature differential can be measured by determining the difference in temperature of, the working fluid at turbine inlet 44 and turbine outlet 46. Additionally, a pressure differential can exist between turbine inlet 44 and turbine outlet 46. In one embodiment, the pressure differential between turbine inlet 44 and turbine outlet 46 can be in the range of from about 500 to about 6,000 psi, in the range of from about 1,000 to about 4,000 psi, or in the range of from 1,000 to 2,000 psi.

After causing rotation of the one or more turbines, the resulting expanded working fluid can be discharged from turbine assembly 42 via turbine outlet 46, and can be routed to first pass 54 of heat exchanger 52, described above. While in first pass 54, the expanded working fluid can have its temperature further reduced to thereby form a pre-cooled working fluid. In one embodiment, the temperature of the working fluid can be decreased in first pass 54 by at least about 50° C. at least about 75° C., or at least 100° C. The pre-cooled working fluid can be discharged from first pass 54 of heat exchanger 52 via line 58.

In one embodiment, the pre-cooled working fluid can be routed to condenser 60 via line 58, where it can undergo further cooling. In condenser 60, the pre-cooled working fluids can have its temperature further reduced so as to form a cooled working fluid. The working fluid can have a reduction in temperature in condenser 60 sufficient to produce a cooled working fluid having a temperature in the range of from about 0 to about 120° C., in the range of from about 5 to about 80° C., or in the range of from 10 to 40° C. The resulting cooled working fluid can be a primarily liquid phase working fluid. The cooled working fluid can be discharged from condenser 60 and routed to pump 64 via line 62.

Pump 64 can operate to pressurize the cooled working fluid and discharge a pressurized working fluid into line 66. The pressurization by pump 64 can cause a pressure differential to exist between the cooled working fluid in line 62 and the pressurized working fluid in line 66. In one embodiment, the pressure differential between the pressurized working fluid in line 66 and the cooled working fluid in line 62 can be in the range of from about 500 to about 10,000 psi, in the range of from about 500 to about 5,000 psi, or in the range of from 500 to 1,000 psi.

After exiting pump 64, the pressurized working fluid can be routed to second pass 56 of heat exchanger 52 via line 66. While flowing through second pass 56, the pressurized working fluid can have its temperature increased via indirect heat exchange with the expanded working fluid flowing through first pass 54, thereby forming a preheated working fluid. In one embodiment, the pressurized working fluid can have its temperature increased in the range of from about 40 to about 150° C., in the range of from about 40 to about 100° C., or in the range of from 40 to 60° C. The resulting pre-heated working fluid can be discharged from second pass 56 via line 68. The pre-heated working fluid can then be routed back to annular space 32 via line 68. In one embodiment, the pre-heated working fluid in line 68 is the same as the initial predominately liquid phase working fluid discussed above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "including," "includes," and "include" have the same open-ended meaning as "comprising," "comprises," and "comprise."

As used herein, the terms "having," "has," and "have" have the same open-ended meaning as "comprising," "comprises," and "comprise."

As used herein, the terms "containing," "contains," and "contain" have the same open-ended meaning as "comprising," "comprises," and "comprise."

As used herein, the terms "a," "an," "the," and "said" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The preferred forms of the invention described above are to be used as illustration only, and should not be used in a limiting sense to interpret the scope of the present invention. Obvious modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A system for extracting geothermal energy from a heated subterranean zone, said system comprising:
(a) a turbine assembly defining a turbine inlet and a turbine outlet;
(b) a depleted hydrocarbon well comprising a wellbore having casing and a tubing string within the casing defining an annulus space between the tubing string and the casing and where the casing and tubing string at least in part define a closed flow loop coupled in fluid flow communication with said turbine inlet and said turbine outlet, wherein at least a portion of said closed flow loop extends downwardly into said heated subterranean zone where said closed flow loop includes flow in one direction through said tubing string and in the opposite direction through said annulus space and wherein the tubing string comprises an inner tube disposed with an outer tube and defining an annular space therebetween and wherein one or more insulating materials fill the annular space between the inner and outer tubes;

(c) a hydrocarbon working fluid operable to flow through said closed flow loop where the working fluid is transported to the heated subterranean zone through said annular space, where the working fluid undergoes an indirect heat transfer from the heated subterranean zone, where the indirect heat transfer heat exchange causes at least a portion of the working fluid to vaporize thereby forming a predominately vapor phase working fluid, where the predominately vapor phase working fluid flows into a bottom opening of the tubing string, into the tubing string and flows substantially counter current to the flow of the working fluid in the annular space thereby forming an expanded working fluid;

(d) a heat exchanger defining a first pass and a second pass, where the expanded working fluid is discharged from the turbine assembly via the turbine outlet and routed to the first pass thereby forming a pre-cooled working fluid;

(e) a condenser interposed in said closed flow loop and operable to cool at least a portion of said expanded working fluid downstream of said turbine outlet and upstream of the portion of said flow loop contacting said heated subterranean zone thereby producing a cooled working fluid;

(f) a pump interposed in said closed flow loop between said condenser and the portion of said closed flow loop contacting said heated subterranean zone wherein the pump is operable to pressurize the cooled working fluid thereby producing a pressurized working fluid; and where the pressurized working fluid is discharged from the pump into the heat exchanger second pass thereby forming a pre-heated working fluid, where the pre-heated working fluid is directed down into the wellbore through said annulus space so that the pre-heated working fluid, when heated and vaporized, returns up through said tubing string and further wherein the depleted hydrocarbon well previously operated to produce a hydrocarbon-containing material and has produced hydrocarbon-containing material in an amount of at least 50 percent of the initial estimated hydrocarbon capacity.

* * * * *